(12) United States Patent
Taubin et al.

(10) Patent No.: US 10,928,190 B2
(45) Date of Patent: Feb. 23, 2021

(54) TECHNIQUES FOR SHAPE MEASUREMENT USING HIGH FREQUENCY PATTERNS AND RELATED SYSTEMS AND METHODS

(71) Applicant: Brown University, Providence, RI (US)

(72) Inventors: Gabriel Taubin, Providence, RI (US); Daniel Alejandro Moreno, Northbridge, MA (US)

(73) Assignee: Brown University, Providence, RI (US)

( * ) Notice: Subject to any disclaimer, the term of this patent is extended or adjusted under 35 U.S.C. 154(b) by 93 days.

(21) Appl. No.: 16/144,272

(22) Filed: Sep. 27, 2018

(65) Prior Publication Data
US 2019/0101382 A1 Apr. 4, 2019

Related U.S. Application Data

(60) Provisional application No. 62/564,168, filed on Sep. 27, 2017.

(51) Int. Cl.
*H04N 5/225* (2006.01)
*G01B 11/25* (2006.01)
*G06F 17/17* (2006.01)

(52) U.S. Cl.
CPC ........ *G01B 11/254* (2013.01); *G01B 11/2513* (2013.01); *G01B 11/2518* (2013.01); *G06F 17/17* (2013.01); *H04N 5/2256* (2013.01)

(58) Field of Classification Search
CPC ............ G01B 11/2513; G01B 11/2518; G01B 11/254; G06F 17/17; H04N 5/2256
See application file for complete search history.

(56) References Cited

PUBLICATIONS

Moreno, Daniel, Kilho Son, and Gabriel Taubin. "Embedded phase shifting: Robust phase shifting with embedded signals." Proceedings of the IEEE Conference on Computer Vision and Pattern Recognition. 2015. (Year: 2015).*

Xing, Shuo, and Hongwei Guo. "Temporal phase unwrapping for fringe projection profilometry aided by recursion of Chebyshev polynomials." Applied optics 56.6 (2017): 1591-1602. (Year: 2017).*

Caspi, et al., "Range Imaging With Adaptive Color Structured Light", IEEE Transactions on Pattern Analysis and Machine Intelligence, vol. 20, Issue 5, Jun. 1998, pp. 470-480.

Gupta, et al., "Micro Phase Shifting", IEEE Conference on Computer Vision and Pattern Recognition (CVPR), Jun. 2012, pp. 1-8.

(Continued)

*Primary Examiner* — Nirav G Patel
(74) *Attorney, Agent, or Firm* — Adler Pollock & Sheehan P.C.

(57) ABSTRACT

Techniques for scanning through structured light techniques that are robust to global illumination effects and that provide an accurate determination of position as provided. According to some aspects, described techniques may be computationally efficient compared with conventional techniques by making use of a novel approach of selecting frequencies of patterns for projection onto a target that mathematically enable efficient calculations. In particular, the selected frequencies may be chosen so that there is a known relationship between the frequencies. This relationship may be derived from Chebyshev polynomials and also relates the chosen frequencies to a low frequency pattern.

10 Claims, 11 Drawing Sheets

(56) References Cited

PUBLICATIONS

Gupta, et al., "Structured Light 3D Scanning in the Presence of Global Illumination", IEEE Conference on Computer Vision and Pattern Recognition (CVPR), Jun. 2011, pp. 713-720.

Ha, et al., "Dense Depth and Albedo From a Single-shot Structured Light", International Conference on 3D Vision, 2015, pp. 127-134. (English Abstract Only).

Huang, et al., "Color-encoded Digital Fringe Projection Technique for High-speed Three-dimensional Surface Contouring", Optical Engineering, vol. 38, Issue 6, 1999, pp. 1065-1071.(English Abstract Only).

Inokuciii, et al., "Range-imaging for 3D Object Recognition", In Proceedings of the ICPR, vol. 48, 1984, pp. 806-808.(English Abstract Only).

Jankovic, "Parkinson's Disease: Clinical Features and Diagnosis", Journal of Neurology, Neurosurgery & Psychiatry, vol. 79, Issue 4, Apr. 2008, pp. 368-376.

Moreno, et al., "Simple, Accurate, and Robust Projector-Camera Calibration", Second International Conference on 3D Imaging, Modeling, Processing, Visualization & Transmission, 2012, pp. 464-471.

Nayar, et al., "Fast Separation of Direct and Global Components of a Scene using High Frequency Illumination", ACM Transactions on Graphics, vol. 25, Issue 3, Jul. 2006.

Pan, et al., "Color Phase-shifting Technique for Three-dimensional Shape Measurement", Optical Engineering, vol. 45, Issue 1, 2006, pp. 013602-013602.(English Abstract Only).

Posdamer, et al., "Surface Measurement by Space-encoded Projected Beam Systems", Computer Graphics and Image Processing, vol. 18, Issue 1, 1982, pp. 1-17.(English Abstract Only).

Pribanic, et al., "Efficient and Low-cost 3D Structured Light System Based on a Modified Number-theoretic Approach", EURASIP Journal on Advances in Signal Processing, 2010, pp. 1-11.(English Abstract Only).

Saldner, et al., "Temporal Phase Unwrapping: Application to Surface Profiling of Discontinuous Objects", Applied optics, vol. 36, Issue 13, 1997, pp. 2770-2775.(English Abstract Only).

Salvi, et al., "A state of the art in structured light patterns for surface profilometry", Pattern Recognition, vol. 43, Issue 8, Aug. 2010, pp. 2666-2680.

Salvi, et al., "Pattern Codification Strategies in Structured Light Systems", Pattern Recognition, vol. 37, Issue 4, Apr. 2004, pp. 827-849.(English Abstract Only).

Srinivasan, et al., "Automated Phase-measuring Profilometry: A Phase Mapping Approach", Applied Optics, vol. 24, Issue 2, 1985, pp. 185-188.(English Abstract Only).

Tavares, et al., "Quantitative Measurements of Alternating Finger Tapping in Parkinson's Disease Correlate With UPDRS Motor Disability and Reveal the Improvement in Fine Motor Control From Medication and Deep Brain Stimulation", Movement disorders, vol. 20, Issue 10, Oct. 2005, pp. 1286-1298.(English Abstract Only).

Wust, et al., "Surface Profile Measurement Using Color Fringe Projection", Machine Vision and Applications, vol. I, Issue 3, 1991, pp. 193-203.

Zhang, "3d Range Data Compression With a Virtual Fringe Projection System", In SPIE Sensing Technology+ Applications, International Society for Optics and Photonics, 2015, pp. 948902-948902.

Zhang, et al., "Rapid Shape Acquisition Using Color Structured Light and Multi-pass Dynamic Programming", In Proceedings of the 1st International Symposium on 3D Data Processing, Visualization, and Transmission (3DPVT), Jun. 19-21, 2002, pp. 24-36.

Moreno et al., "Embedded phase shifting: Robust phase shifting with embedded signals", In IEEE Conference on Computer Vision and Pattern Recognition (CVPR), pp. 2301-2309. IEEE, 2015. 4, 6.

* cited by examiner

TECHNIQUES FOR SHAPE MEASUREMENT USING HIGH FREQUENCY PATTERNS AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/564,168, filed Sep. 27, 2018, titled "System and Method for Shape Measurement Using High Frequency Sinusoidal Patterns," which is hereby incorporated by reference in its entirety.

GOVERNMENT FUNDING

This invention was made with government support under Grant No. IIP-1500249 awarded by the National Science Foundation. The government has certain rights in the invention.

BACKGROUND

The shape of a three-dimensional object can be determined through the application of various scanning techniques. Some of these techniques involve shining visible light (or some other radiation) onto a target object or scene and producing one or more images of the illuminated target. These images can be analyzed to determine the shape of the target and to produce a three-dimensional model if desired.

SUMMARY

According to some aspects, a computer-implemented method of determining the shape of an object is provided, the method comprising obtaining a first image of an object, the first image being captured whilst the object is illuminated with light having a spatially repeating pattern of a first frequency, obtaining a second image of the object, the second image being captured whilst the object is illuminated with light having a spatially repeating pattern of a second frequency, obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies, calculating, based at least in part on the first image, at least a first relative phase representing a relative position within the spatially repeating pattern having the first frequency, calculating, based at least in part on the second image, at least one a second relative phase representing a relative position within the spatially repeating pattern having the second frequency, calculating, based at least in part on the third image, at least a third relative phase representing a relative position within the spatially repeating pattern having the third frequency, calculating, for a pattern of a base frequency, and based at least in part on the first, second and third frequencies, at least one absolute phase representing an absolute position within the pattern of the base frequency, and calculating spatial coordinates for at least one three-dimensional point on the object based at least in part on the calculated absolute phase.

According to some aspects, a non-transitory computer-readable medium is provided comprising instructions that, when executed by at least one processor, perform a method of determining the shape of an object, the method comprising obtaining a first image of an object, the first image being captured whilst the object is illuminated with light having a spatially repeating pattern of a first frequency, obtaining a second image of the object, the second image being captured whilst the object is illuminated with light having a spatially repeating pattern of a second frequency, obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies, calculating, based at least in part on the first image, at least a first relative phase representing a relative position within the spatially repeating pattern having the first frequency, calculating, based at least in part on the second image, at least one a second relative phase representing a relative position within the spatially repeating pattern having the second frequency, calculating, based at least in part on the third image, at least a third relative phase representing a relative position within the spatially repeating pattern having the third frequency, calculating, for a pattern of a base frequency, and based at least in part on the first, second and third frequencies, at least one absolute phase representing an absolute position within the pattern of the base frequency, and calculating spatial coordinates for at least one three-dimensional point on the object based at least in part on the calculated absolute phase.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Some image-based 3D scanning techniques project patterns of light onto a target object or scene and capture light under such illumination. These techniques, sometimes referred to as structured light techniques, can provide three-dimensional position information on a target by determining the part of the projected pattern that is illuminating a portion of the target. Once it is determined which part of the pattern illuminates a region of an object, the position of the region in space can be determined by triangulating between the region's location within the camera's field of view and the part of the projected pattern within the projector's display area.

Figure 1A:
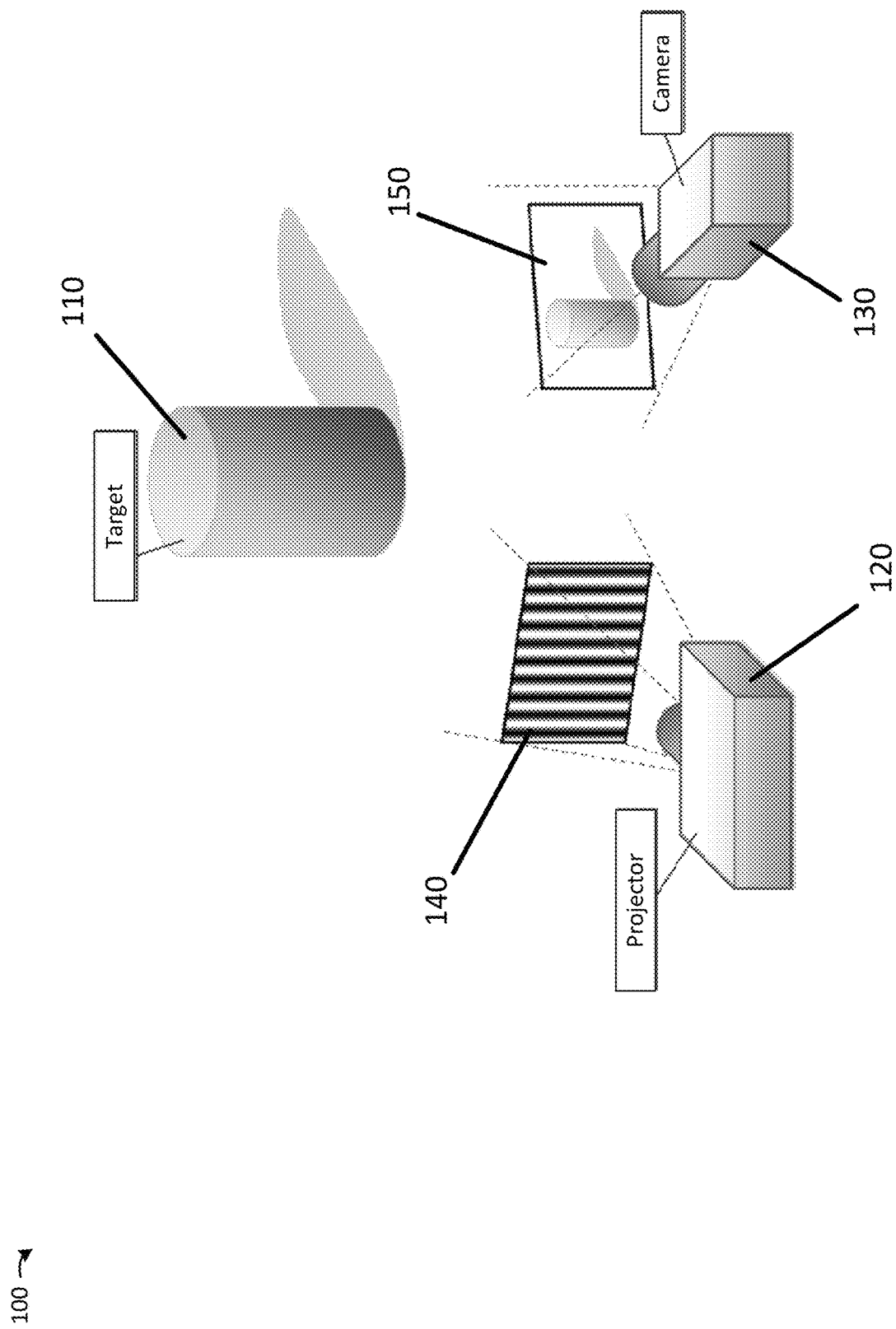
FIG. 1A depicts a typical setup for scanning through structured light techniques, according to some embodiments.

As an illustrative example, FIG. 1A depicts a typical setup for scanning through structured light techniques. A target 110, which could be a scene, an object, a group of objects, etc. is illuminated by a projector 120 which projects light having a pattern 140 onto the target. A camera 130 pointed at the same target captures an image 150 of the target under said illumination. Various different light patterns can be selected for this process, and generally it is necessary to project and capture a sequence of images with different light patterns to gather sufficient information to produce accurate position information.

Figure 1B:
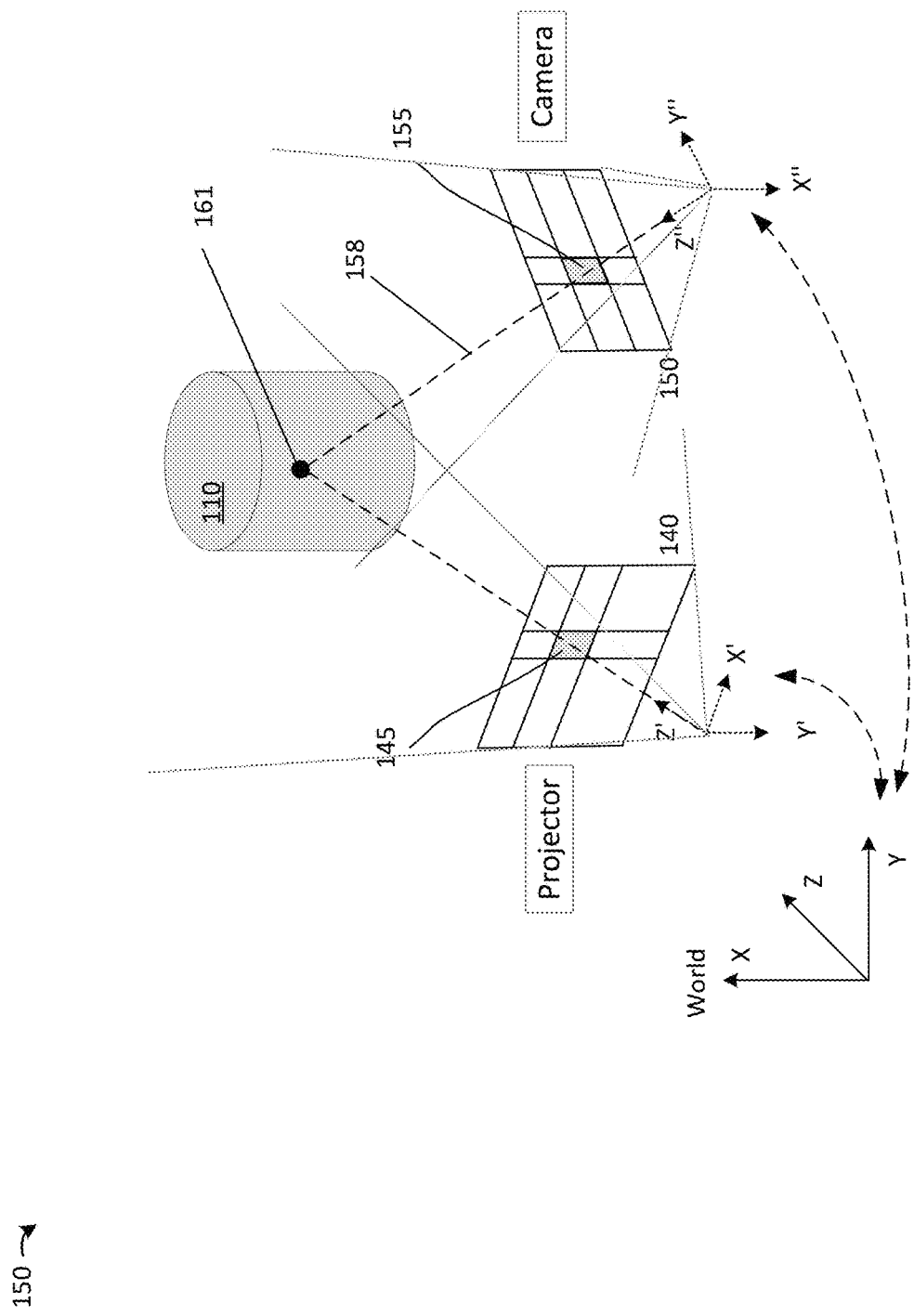
FIG. 1B illustrates an example of how optical triangulation works in a structured light scanning setup, according to some embodiments.

FIG. 1B illustrates an example of how optical triangulation works in a structured light scanning setup. In the example of FIG. 1B, an object 110 is illuminated by a projector which projects an image 140 composed of pixels, including pixel 145, at the object. A camera image 150 is also composed of pixels including pixel 155 and is captured whilst the object 110, including point 161, is illuminated by the projected image 140. Each of the projector and the camera are oriented in different coordinate systems, shown in FIG. 1B as (X', Y', Z') and (X'', Y'', Z''), respectively. If pixel 145 produced by the projected image 140 onto point 161 is identified as having been captured within pixel 155 of the camera image and the relative locations of the project and camera are known (or equivalently, the transform between the two coordinate systems is known), a position of point 161 relative to the projector and the camera (such as a depth measurement) can be determined. This process can be repeated for the pixels in the camera image and positions of the imaged points in three-dimensions can be determined.

Figure 1C:
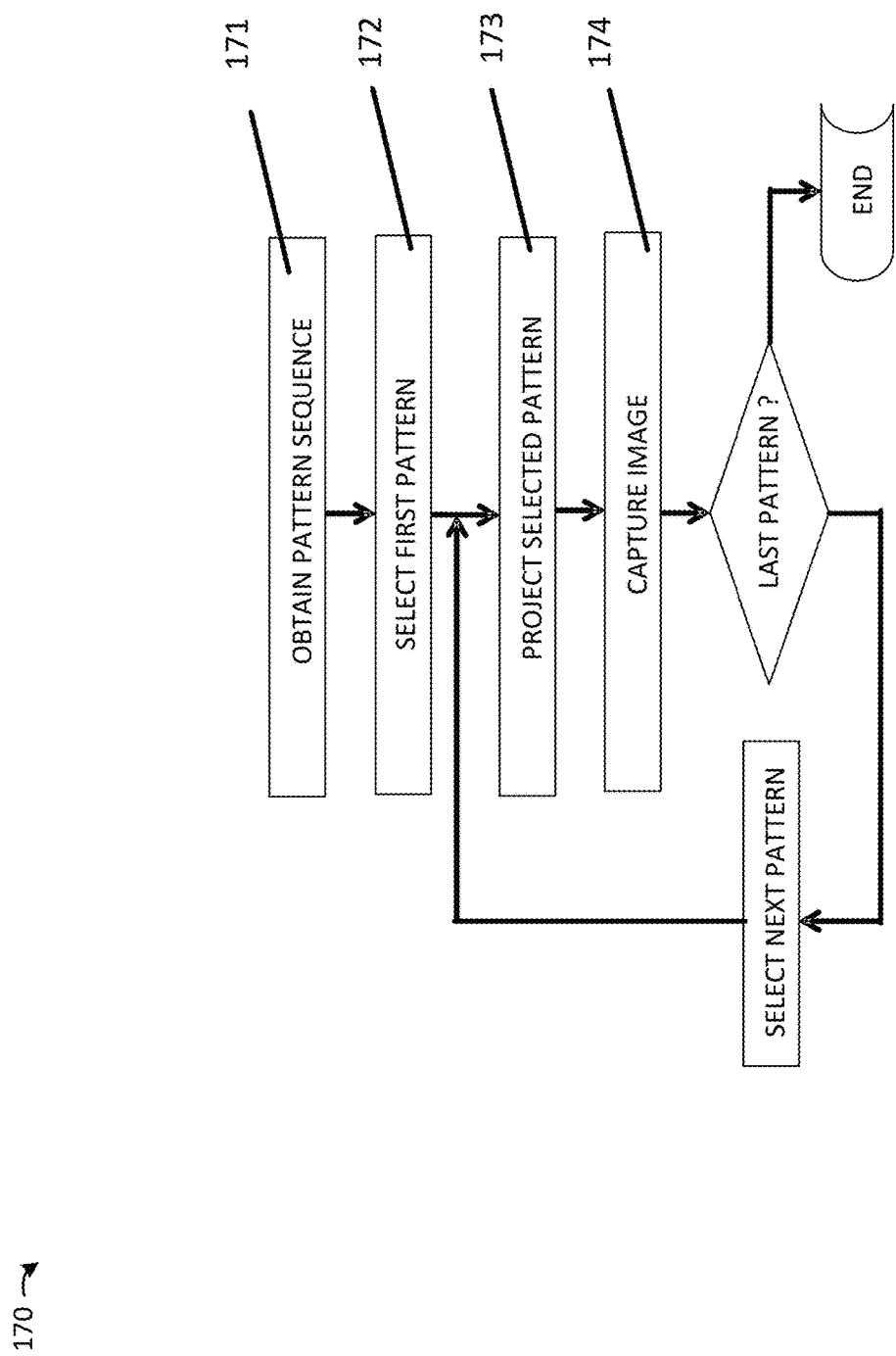
FIG. 1C depicts a typical process of generating images for structured light scanning, according to some embodiments.

A typical process of generating images for structured light scanning is depicted as a flow chart in FIG. 1C. In the example method 170 of FIG. 1C, patterns to be projected are obtained in act 171, for instance by accessing one or more previously generated images, and/or by generating one or more images comprising desired patterns. The patterns may in some cases include spatially repeating patterns, which may repeat along any desired axis of the projected images. In act 172, one of the images comprising a pattern is selected and this image is projected onto a target in act 173. During at least part of the time that the selected pattern is projected onto the target, an image of the target is captured in act 174. This process of projection and capture is repeated for the remaining images/patterns.

In some cases, images for structured light scanning comprise a sinusoidal pattern which repeats along an axis of the image. This axis may be aligned in any direction, such as horizontally, vertically or diagonally, or indeed such that the pattern intensity is constant along any family of non-intersecting curves. While pixels may in some cases be square, in other cases they may be of a different shape, such as diamond-shaped. In such cases, it may be preferable to use a sinusoidal pattern which repeats in a diagonal direction.

Figure 2B:
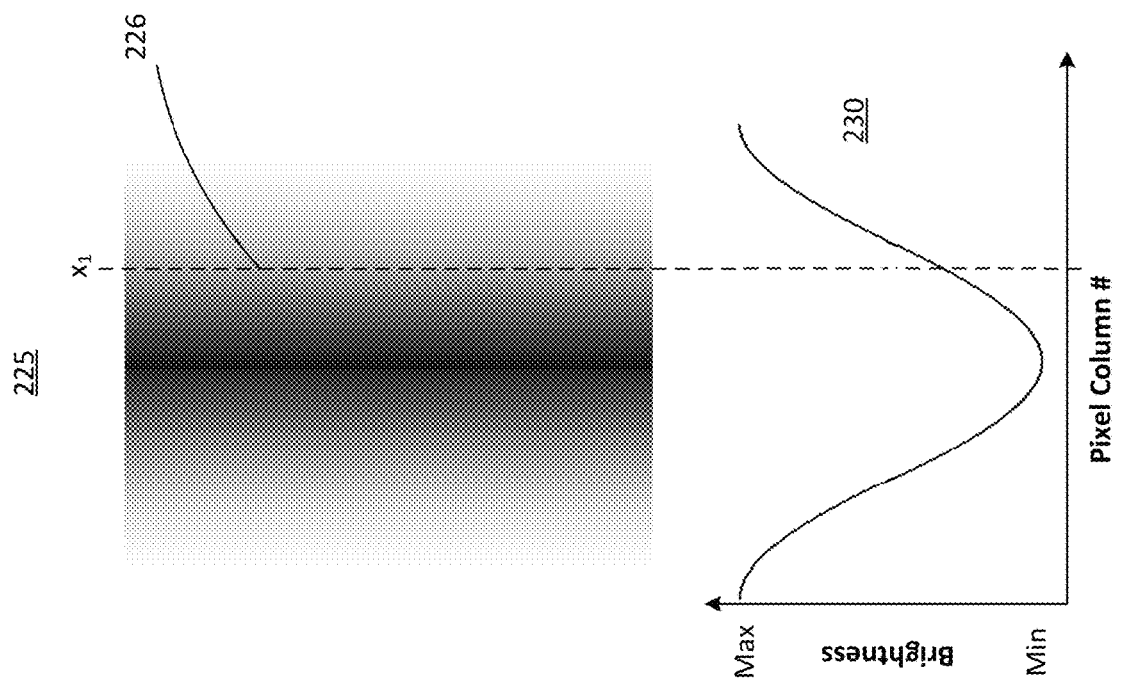
FIG. 2B depicts an example of an image that comprises a low frequency sinusoidal pattern, according to some embodiments.
Figure 2A:
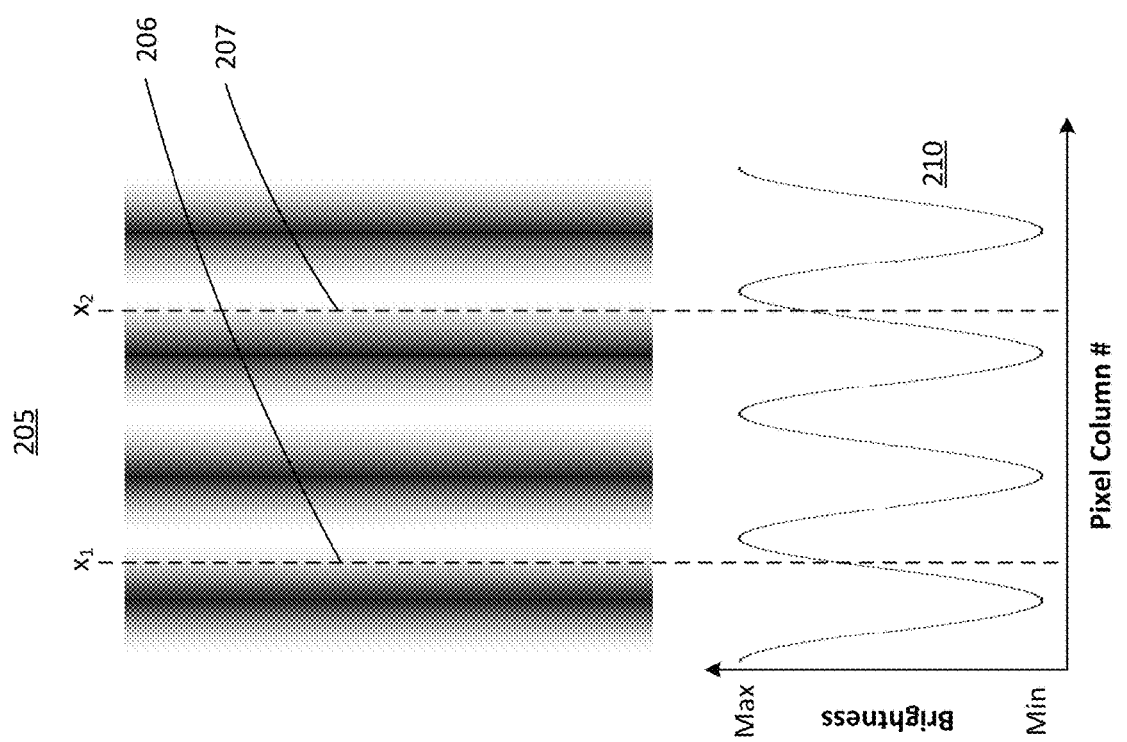
FIG. 2A depicts an example of an image for structured light scanning that comprises a sinusoidal pattern, according to some embodiments.

FIG. 2A depicts an example of such a pattern in image 205, which is oriented so that a projector projecting the image 205 will project the same light intensity for all pixels in the same column. A plot 210 depicting the varying brightness levels of image 205 changing with each pixel column is shown beneath the image in FIG. 2A. It will be appreciated that, depending on the number of pixel columns, the curve plot 210 may not necessary be as smooth as depicted because the brightness values may be quantized to express the curve using a finite number of columns.

Figure 2D:
FIG. 2D depicts a point cloud of the hand shown in FIG. 2C, according to some embodiments.
Figure 2C:
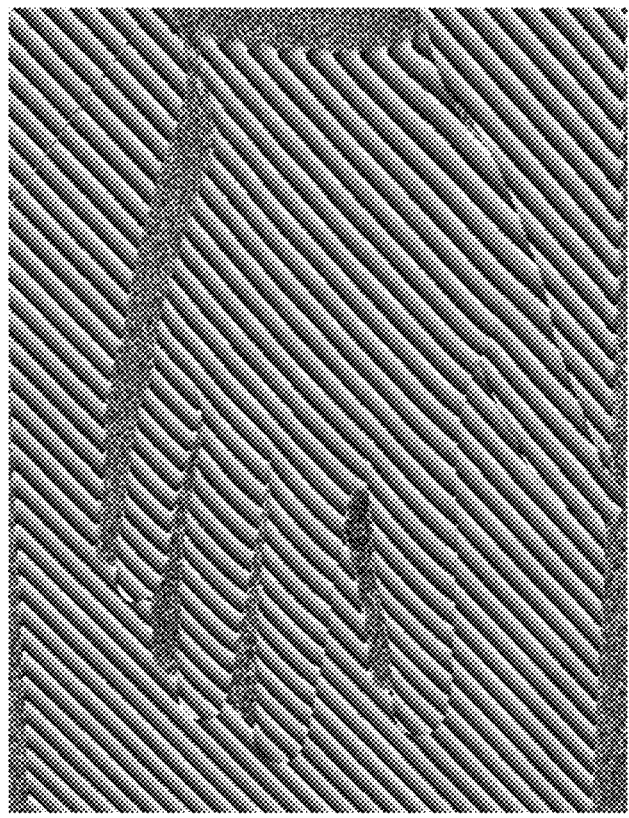
FIG. 2C illustrates pixels within the image of a hand illuminated with a high frequency sinusoidal pattern, according to some embodiments.

When the pattern of image 205 is projected onto a target, each of the stripes of light effectively represents a different angle between the projector and the location where the light is incident in the scene. When a camera images the target, therefore, if the horizontal position within the pattern of image 205 can be determined, this establishes an angle between the projector and the imaged position, allowing triangulation of the position as discussed above and shown in FIG. 1B. For instance, pixels within the image of a hand illuminated with a high frequency sinusoidal pattern, as shown in FIG. 2C, can be analyzed to determine positions of a number of three-dimensional points to build a so-called "point cloud" of the hand as shown in FIG. 2D.

Conventionally, one of the challenges to the approach of projecting patterns such as that of image 205 is that establishing the intensity of the projected image being observed does not provide an absolute indication of which part of the pattern produced the observation. For instance, pixels at the horizontal positions $x_1$ and $x_2$ shown in FIG. 2A both produce the same light intensity—put another way, pixels in these columns have the same phase along the brightness curve. Determining the phase of a pixel imaged by a camera based on image 205, therefore, does not provide a definite indication of the part of the projected image that produced the pixel's intensity.

One approach to address this issue is to also project an image comprising a low frequency pattern onto the target and capture an image of the illuminated target. An example of this type of pattern is shown in FIG. 2B. Because there is much less degeneracy in the projected intensity in image 225 compared with image 205, determining a phase of an imaged pixel captured during projection of image 225 provides a better measure of the absolute position. Reliance on such an image presents other challenges, however. Because the intensity of image 225 changes so gradually, there can be a greater occurrence of optical problems including errors in accurately determining the imaged intensity.

An additional challenge with structured light techniques is that, unless images are projected in a dark room, the camera measures light from sources other than the projector. Such additional light may be referred to as "ambient" light. Moreover, the camera may also capture light emitted from the projector but that takes an indirect path to the camera, such as via reflections or light scattering within the surface of an object. Indirect illumination, ambient illumination, and any other source of light other than light that travels directly to a target and to the camera may collectively be referred to as "global" illumination.

The inventors have recognized and appreciated techniques for scanning through structured light techniques that are robust to global illumination effects and that provide an accurate determination of position. Moreover, these techniques are computationally efficient compared with conventional techniques by making use of a novel approach of selecting frequencies of patterns for projection onto a target that mathematically enables efficient calculations. In particular, the selected frequencies are chosen so that there is a known relationship between the frequencies. The known relationship is derived from Chebyshev polynomials and also relates the chosen frequencies to a low frequency pattern referred to as a "base" frequency. This relationship allows the determination of a phase of an observed intensity within a pattern of the base frequency without it being necessary to project and capture an image of the target with this pattern. Thus, the optical problems discussed above in relation to FIG. 2B can be mitigated or avoided by analytically calculating a phase within a low frequency pattern, rather than capturing an image that may exhibit errors.

According to some embodiments, a scanning process may comprise projecting images that include images of a spatially repeating pattern having at least three different frequencies. These frequencies of the pattern may be selected so that they are numerically equally spaced—that is, amongst first, second and third frequencies that are different, the difference between the first and second frequencies is equal to the difference between the second and third frequencies. In some cases, multiple different images that include the pattern at the same frequency may be projected during scanning (e.g., projections of the pattern two or more times at the same frequency but with differing phase shifts).

According to some embodiments, a scanning process may comprise projecting images that include a sinusoidal pattern. A sinusoidal pattern may include any oscillating pattern of light intensity, irrespective of whether the image may also exhibit other varying properties such as a varying color, hue, saturation, etc. A sinusoidal pattern may repeat along any desired axis of a projected image, although for simplicity and/or accuracy it may be preferable to repeat the pattern in either the row or column direction of the image (so that all pixels in the same column or row, respectively, have the same projected intensity), or in the diagonal direction.

According to some embodiments, a scanning process may comprise projecting images of a spatially repeating pattern two or more times at the same frequency but with differing phase shifts. In some cases, projection and capture of a single image may be insufficient to determine a relative phase of an intensity value observed in the captured image. For instance, while the range of intensities produced by the projector may be known, the range of intensities that this light may produce upon a target may not be known. In addition, the observed intensity may also change with distance from the projector as the projected light spreads out. For this reason, it may be beneficial to project multiple images of the same pattern with different phase shifts to determine a relative phase value of an observed intensity. By analyzing these multiple images together, the relative phase value may be determined independently of any of the above-mentioned variations in received intensity.

According to some embodiments, a scanning process may comprise projecting at least seven images of a spatially repeating pattern. The at least seven images may include images of the pattern at at least three different frequencies as discussed above. Moreover, the at least seven images may include images of the pattern two or more times at the same frequency but with differing phase shifts.

According to some embodiments, a scanning process may comprise calculating a relative phase within a pattern of projected images for each of the different frequencies of the pattern contained within the images. For instance, when the scanning process comprises projecting images of the pattern at at least three different frequencies, at least three relative phases may be calculated, one for each of the at least three different frequencies.

According to some embodiments, a scanning process may comprise calculating an absolute phase within a pattern at a base frequency. A base frequency may be a low frequency such that, when a pattern of the base frequency is projected onto a target, a determination of relative phase based on an observed intensity also represents the absolute phase measurement. For instance, the base frequency pattern may contain a single oscillation, or half of an oscillation, across the projected image.

According to some embodiments, a scanning process may comprise a process of phase unwrapping. Phase unwrapping, as referred to herein, is a process of determining an absolute phase within a projected pattern based on a relative phase. For instance, faced with a relative phase measurement that matches both measurements 206 and 207 in the example of FIG. 2A, a phase unwrapping process may determine whether the measurement represents measurement 206 or measurement 207 (or any of the other absolute phases in the example that might also have produced this relative phase value).

Following below are more detailed descriptions of various concepts related to, and embodiments of, techniques for scanning through structured light techniques. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 3:
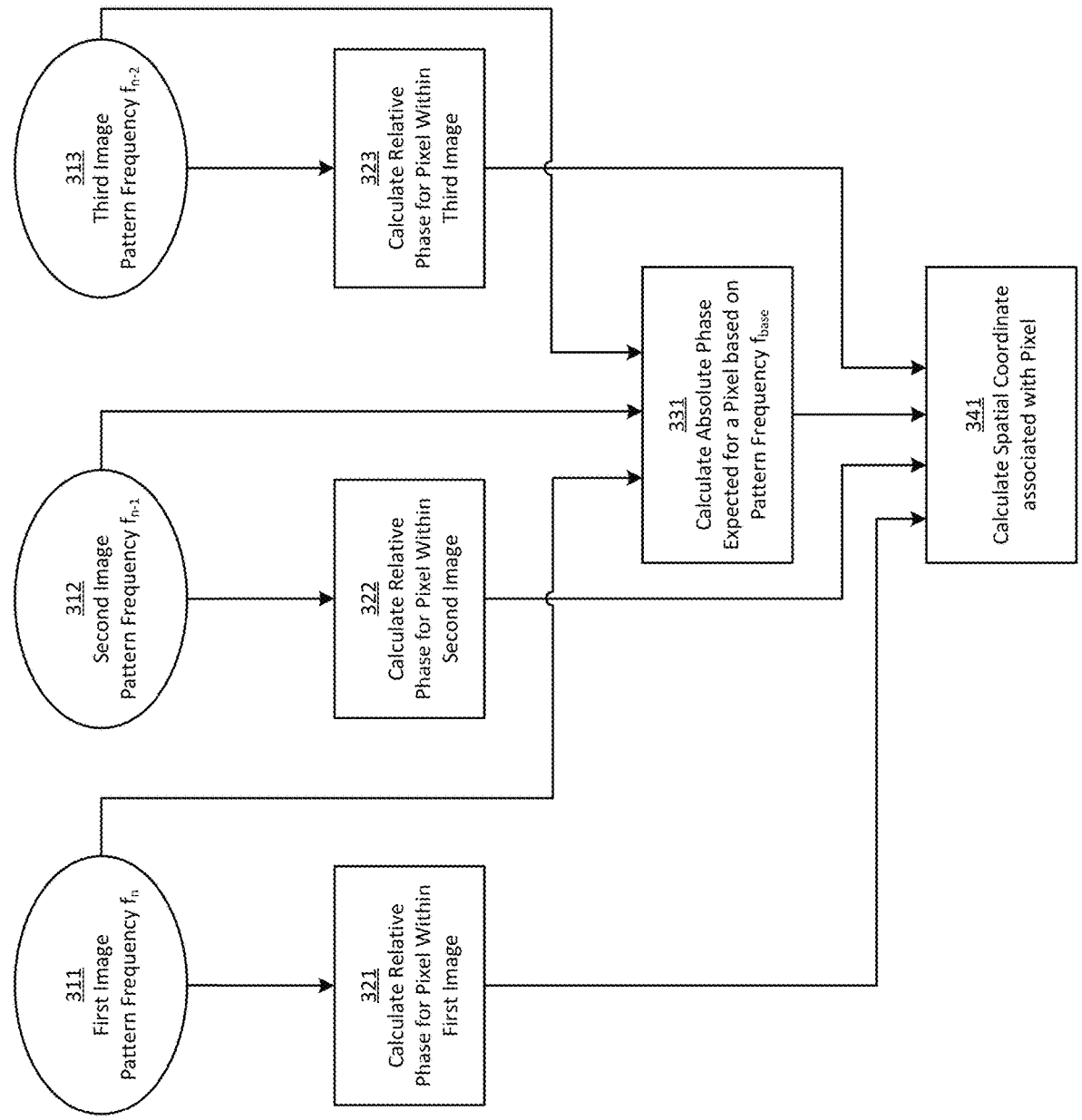
FIG. 3 is a flowchart of a method of scanning through structured light techniques, according to some embodiments.

FIG. 3 is a flowchart of a method of scanning through structured light techniques, according to some embodiments. In the example of FIG. 3, method 300 begins with three images, 311, 312 and 313, which are images of a common target captured whilst a an image comprising a spatially repeating pattern is projected onto the target. The three images differ in terms of the frequency of the pattern projected during their capture. In particular, the frequencies of the patterns within images 311, 312 and 313 are $f_n$, $f_{n-1}$ and $f_{n-2}$, respectively, where these frequencies are all multiples of the same frequency $f_n = n f_1$. As a result, the difference between frequencies $f_n$ and $f_{n-1}$, and the difference between frequencies $f_{n-1}$ and $f_{n-2}$, is equal to $f_1$.

In some cases, an example of which is discussed below, more than one image comprising a pattern at one of the frequencies $f_n$, $f_{n-1}$ and $f_{n-2}$ may be provided as input to method 300. In such cases, there may be additional unknown variables that require additional images with the same frequency pattern (but exhibiting, for instance, relative phase shifts) to determine all of the unknown variables. This may not always be the case, however, and as such method 300 is described in terms of three input images 311, 312 and 313, which is the minimum number of images for practice of the techniques described herein.

According to some embodiments, each of images 311, 312 and 313 may be a monochromatic image or may be a color image. In some embodiments, one or more of images 311, 312 and 313 may be a single image captured during illumination of a target with multiple different patterns of the same frequency. For instance, a single image may represent a target illuminated with three different patterns of the same frequency but with relative phase shifts when the three patterns illuminated the target simultaneously with different colors (alternatively, the patterns may illuminate the target sequentially and an image captured for each, then the resulting three images may be color combined). For example, three patterns of frequency $f_n$ may illuminate a target: a first with no phase shift having varying intensities of red light, a second with a first phase shift having varying intensities of green light, and a third with a second phase shift having varying intensities of blue light. A single image capture of the illuminated target may therefore contain information on illumination of the target with all three patterns within the single image.

In some embodiments, $f_1$ may be defined based on a dimension of the images 311, 312 and 313. For example, in the case where the pattern repeats in a row direction of the images (so that all pixels in the same column of an image have the same intensity), $f_1$ may be defined based on of the number of pixel columns in the image, such as $f_1 = \pi/x_{max}$ where $x_{max}$ is the number of columns.

Irrespective of how $f_1$ is defined, selection of the frequencies with the above relationship means that the following relations are true for all n>2:

$$\cos(f_n x) = 2\cos(f_1 x)\cos(f_{n-1} x) - \cos(f_{n-2} x)$$

$$\sin(f_n x) = 2\cos(f_1 x)\sin(f_{n-1} x) - \sin(f_{n-2} x)$$

These relations are related to the construction of Chebyshev polynomials, and provide a relationship between the frequencies of the patterns of the images 311, 312 and 313 and the frequency $f_1$.

In the example of FIG. 3, the images 311, 312 and 313 may be obtained in any suitable manner, including by accessing data files representing the images and/or by generating one or more images according to the pattern and the selected frequency. In some cases, images may be generated based on a selected phase shift in addition to a selected frequency. A value of n, which defines the selected frequencies in terms of $f_1$, may have any suitable value greater than 2, although it may be preferable that n has a value of at least 50, or at least 100, or at least 150, or at least 200.

In act 321, the first image 311 is analyzed to determine relative phase values for the intensity values of the image. In some embodiments, act 321 may comprise analyzing each pixel of the first image 311 (serially or in parallel) to determine, based on the intensity of the pixel captured by the camera, the relative phase of the portion of the projected image that produced this pixel. In some embodiments, the pixels of image 311 may be analyzed independently of one another, which may allow for parallel analysis of the pixels to improve processing efficiency.

As discussed above, in some embodiments a scanning process may comprise projecting images of a spatially repeating pattern two or more times at the same frequency but with differing phase shifts. These phase shifts may allow a determination of relative phase that is independent of the range and offset of intensities captured by the camera.

As a non-limiting example, the projector may be modeled as a continuous image plane with column coordinates varying from 0 to $x_{max}$ and the projected patterns may be assumed for the sake of example to have a constant intensity within respective projector columns. The intensity value of each pixel P=(x,y) in a projected image P can be described by the relation shown in Equation 1 below, where a projector offset $o_p$ and a projector amplitude $a_p$ are constants to fit the projection dynamic range, f is a pattern frequency, and θ is a pattern phase shift. The values of the projector offset $o_p$ and the projector amplitude $a_p$ may be assumed the same for all the projector pixels:

$$P(x,y) = o_p + a_p \cos(fx + 0) \qquad \text{(Eqn. 1)}$$

The light intensity l(u, v) measured by a camera observing a scene illuminated by the projected image P at a pixel with coordinates (u, v) can be modeled using a similar relation, shown in Equation 2.

$$l(u,v) = o_c + a_c \cos(fx + 0) \qquad \text{(Eqn. 2)}$$

The difference between Equations 1 and 2 is that in Equation 2 only the measured intensity l(u, v), the pattern frequency f, and the phase shift θ are known. The measured intensity is simply the intensity of a pixel in the image captured by the camera. The frequency and phase shift are known because they are defined by the selected pattern projected in the image P(x, y). However, the camera offset $o_c$, the camera amplitude $a_c$, and the corresponding phase value x of the pattern that produced the observed intensity l(u, v) are unknown.

In general, the camera offset $o_c$ and the camera amplitude $a_c$ may not have the same values for each pixel of the image captured by the camera. As a result, these values may be modeled as being function on the camera pixel (u, v).

Equation 2 can be rewritten using a trigonometric identity to separate the known phase shift θ from the unknown phase value x, $$I(u, v) = o_c + a_c(\cos(fx)\cos(\theta) - \sin(fx)\sin(\theta)) \qquad \text{(Eqn. 3)}$$

$$I(u, v) = \begin{bmatrix} 1 & \cos(\theta) & -\sin(\theta) \end{bmatrix} \begin{bmatrix} o_c \\ a_c \cos(fx) \\ a_c \sin(fx) \end{bmatrix} \qquad \text{(Eqn. 4)}$$

Let U=U(u, v) be the 3-vector at the right hand end of Equation 4, and let $U_i$ be i-th component of vector U $$U = \begin{bmatrix} U_1 \\ U_2 \\ U_3 \end{bmatrix} = \begin{bmatrix} o_c \\ a_c \cos(fx) \\ a_c \sin(fx) \end{bmatrix}$$

The vector U is the only unknown in Equation 4, which is linear in U. As discussed above, in some embodiments a scanning process may comprise projecting images of a spatially repeating pattern two or more times at the same frequency but with differing phase shifts. These phase shifts may allow a determination of relative phase that is independent of the range and offset of intensities captured by the camera.

As such, the value of the vector U can be computed by projecting two additional sinusoidal phase shifting patterns with the same frequency f but different phase shifts $\theta_1$, $\theta_2$, $\theta_3$ and solving the resulting system of three linear equations in three variables. If the three phase shifts are different from each other it is guaranteed that this system of equations has a unique solution.

$$\begin{bmatrix} I_1(u,v) \\ I_2(u,v) \\ I_3(u,v) \end{bmatrix} = \begin{bmatrix} 1 & \cos(\theta_1) & -\sin(\theta_1) \\ 1 & \cos(\theta_2) & -\sin(\theta_2) \\ 1 & \cos(\theta_3) & -\sin(\theta_3) \end{bmatrix} U$$

Then, the unknown variables in the camera Equation 2 can be recovered as follows:

$$o_c = U_1 \quad \text{(Eqn. 5)}$$

$$a_c = \sqrt{U_2^2 + U_3^2} \quad \text{(Eqn. 6)}$$

$$\hat{x} = \frac{1}{f} \tan^{-1}(U_3, U_2) \quad \text{(Eqn. 7)}$$

Instead of the absolute phase value x, Equation 7 recovers a relative phase value $\hat{x}$, which is congruent to the absolute phase value x modulo the pattern period $T=2\pi/f$. That is, the relative phase value x and the absolute phase value x are related by the equation $$x = NT + \hat{x} \quad \text{(Eqn. 8)}$$

where N is a non-negative integer to be determined.

According to some embodiments, the relative phase may be determined in act 321 for a given pixel in the first image 311 via the above process. In some embodiments, the relative phases of a pixel in the second image 312 and a pixel in the third image 313 may be determined in acts 322 and 323, respectively, via the above process. As discussed below, in some embodiments determining a relative phase shift may not require analysis of three images produced with the same frequency pattern but different phase shifts, but may only require analysis of two such images.

Irrespective of how the relative phases of a pixel are determined in acts 321, 322 and 323, an absolute phase of the pixel may be calculated in act 331. The calculation in act 331 is based upon the first, second and third images and represents the relative phase that would have been determined (e.g., via the above process) from one or more images of a target illuminated with the pattern with a frequency of $f_{base}$. Importantly, the determined phase is based not on an image taken during illumination of the target with the pattern of frequency $f_{base}$, but on the images taken with the frequencies $f_n$, $f_{n-1}$ and $f_{n-2}$. As discussed above, the selection of the frequencies $f_n$, $f_{n-1}$ and $f_{n-2}$ provides a mathematical relationship between $f_n$, $f_{n-1}$ and $f_{n-2}$ and $f_{base}$ based on the Chebyshev polynomials. This avoids the introduction of inaccuracy by capturing an image during projection of the pattern of frequency $f_{base}$ which, as discussed above, may have slowly changing intensity values and may include interfering global illumination effects.

In act 341, a spatial coordinate is determined for a three-dimensional point associated with the pixel being analyzed. The coordinate may comprise a set of coordinates defining a position in three-dimensional space and/or may comprise a distance measurement such as a depth value. The spatial coordinate may be represented in any convenient coordinate system, including a coordinate system of the camera or the projector, or in another coordinate system (e.g., any of those coordinate systems shown in FIG. 1B as (X, Y, Z), (X', Y', Z') and (X", Y", Z")).

Determination of the spatial coordinate in act 341 may be based on the calculated absolute phase in act 331 and any one or more of the relative phases calculated in acts 321, 322 and 323. In some embodiments, a process of phase unwrapping may be applied in act 341 to any one or more of the relative phases determined in acts 321, 322 and 323 to determine a corresponding absolute phase. Phase unwrapping is a process of determining the correct value of N in Equation 8:

$$x = NT + \hat{x} \quad \text{(Eqn. 8)}$$

which relates an absolute phase x to a relative phase $\hat{x}$. This process may be performed in part based on external information such as a measurement of a reference plane. Alternatively, the phase unwrapping process may be based upon the absolute phase determined in act 331, which serves as a reference to unwrap any of the relative phases determined in acts 321, 322 and/or 323. An example of such a process is discussed below in relation to FIG. 7.

Figure 4:
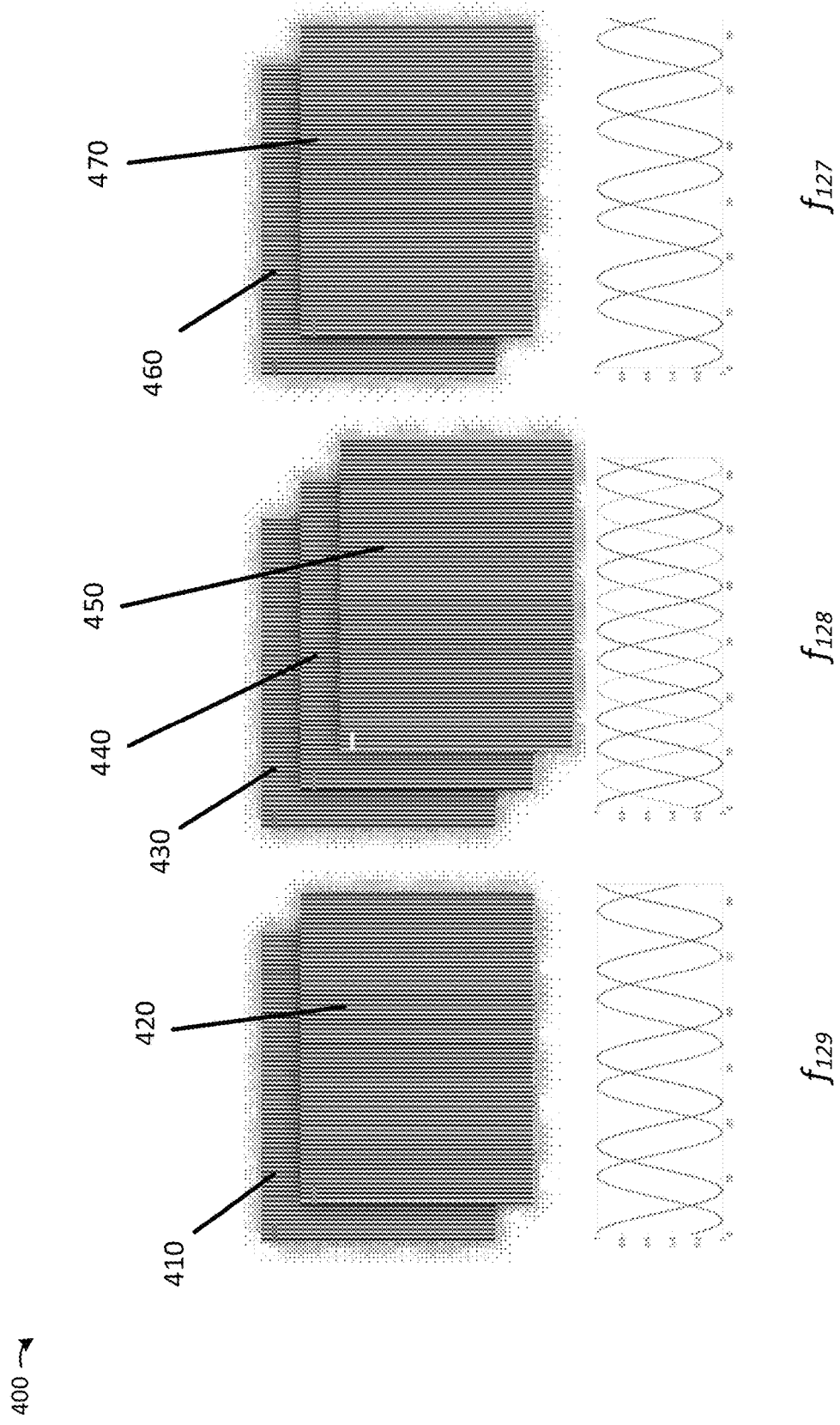
FIG. 4 depicts an example of a set of images that may be individually projected onto a target and captured by a camera to practice the method of FIG. 3, according to some embodiments.

FIG. 4 depicts an example of a set of images that may be individually projected onto a target and captured by a camera to practice the method of FIG. 3, according to some embodiments. In the example of FIG. 4, a set of images 400 includes images 410 and 420, which both comprise a sinusoidal pattern of frequency $f_{129}$, but with phase shifts of 0 and $$\frac{1}{3\pi},$$

respectively. Images 430, 440 and 450 comprise a sinusoidal pattern of frequency $f_{128}$, but with phase shifts of 0, $$\frac{1}{3\pi} \text{ and } \frac{2}{3\pi},$$

respectively. Images 460 and 470 comprise a sinusoidal pattern of frequency $f_{127}$, but with phase shifts of 0 and $$\frac{1}{3\pi}$$

respectively.

In some use cases, it may be preferable to select a value of n so that one or more of the sinusoidal patterns has a period equal to an integer number of pixels. For instance, with a projector producing an image having 1024 columns of pixels, $x_{max} = 1024$ and therefore $f_1 = \pi/x_{max} = \pi/1024$. The above examples with n=128, therefore correspond to frequencies:

$$f_{129} = \frac{2\pi}{15.876}, f_{128} = \frac{2\pi}{16.000}, f_{127} = \frac{2\pi}{16.126}$$

In this illustrative case, the images 430, 440 and 450 comprising patterns of frequency $f_{128}$ have a cosine period of 16 pixels, whereas the images 410, 420, 460 and 470 comprising patterns of frequency $f_{129}$ or $f_{127}$ have a cosine period that is a non-integer number of pixels.

Figure 5:
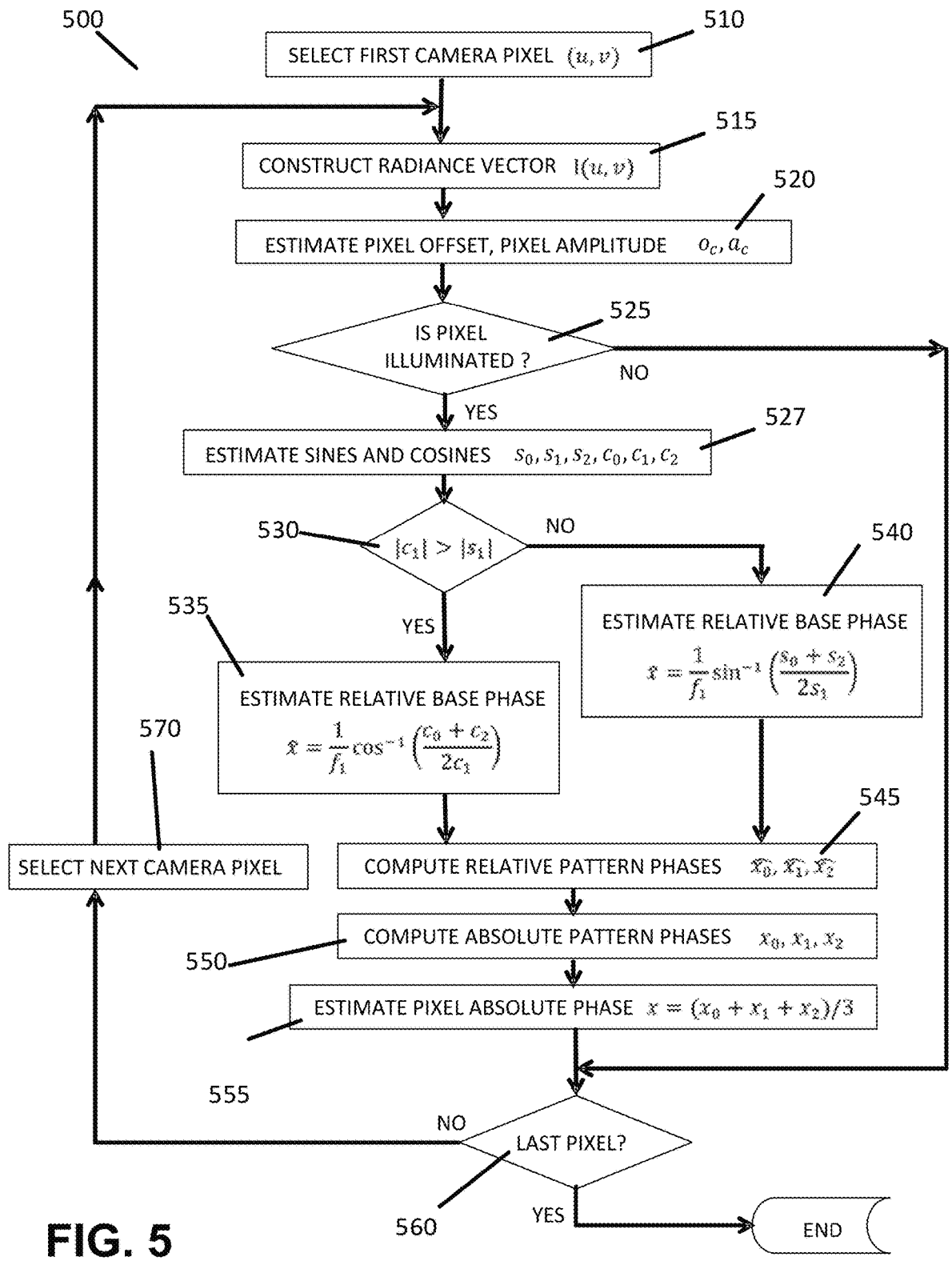
FIG. 5 is a flowchart of a method of determining an absolute phase for each pixel of an image captured during illumination of a target by a spatially repeating pattern, according to some embodiments.

FIG. 5 is a flowchart of a method of determining an absolute phase for each pixel of an image captured during illumination of a target by a spatially repeating pattern, according to some embodiments. Method 500 represents an illustrative approach to the method 300 of FIG. 3.

Method 500 begins in act 510 in which a first pixel is selected from a set of images captured by a camera (e.g., a pixel having the same location in each of images 311, 312 and 313 in the example of FIG. 3, or pixels in each image that may otherwise be identified as corresponding to the same imaged target point).

A pixel in a given image has an intensity l(u, v) where u and v are the row and column indexes to the selected pixel. The light intensity of each instance of this pixel in each of the image being analyzed can be modeled by the following equation:

$$I_{ij}(u, v) = o_c + a_c \cos(f_{n-i}x + \theta_{ij}) = \begin{bmatrix} 1 & \cos(\theta_{ij}) & -\sin(\theta_{ij}) \end{bmatrix} \begin{bmatrix} o_c \\ a_c \cos(f_{n-i}x) \\ a_c \sin(f_{n-i}x) \end{bmatrix}$$

where the camera offset $o_c$, the camera amplitude $a_c$, and the corresponding column value x are unknown functions of the pixel (u, v), and the selected pattern frequencies $f_n$, $f_{n-1}$, and $f_{n-2}$, and phase shifts $\theta_{ij}$ are known. The index i corresponds to the set of images with the same frequency and the index j corresponds to the different phase shifts applied to each of these images.

In act 515, a radiance vector is constructed in the following way. The above expression for $l_{ij}(u, v)$ represents a number of equations equal to the total number of images being analyzed, henceforth referred to as $N_{images}$. These equations can be regarded as a system of linear equations l=MU in the unknown $N_{images}$-dimensional column vector $$U = [o_c, a_c \cos(f_n x), a_c \sin(f_n x), a_c \cos(f_{n-1}x), a_c \sin(f_{n-1}x), a_c \cos(f_{n-2}x), a_c \sin(f_{n-2}x)]^t$$

where l=l(u, v) is a column vector of dimension equal to $N_{images}$ constructed by concatenating the measured pixel intensity values $l_{ij}(u, v)$, and M is a matrix with $N_{images}$ rows and seven columns, whose entries are functions of the phase shifts $\theta_{ij}$.

If the number of equations $N_{images}$ is at least seven, the number of unknowns, the system of linear equations l=MU may be solved in the least squares sense, using for example the Singular Value Decomposition of the matrix M. Alternatively, the pseudo-inverse $M^t$ of the matrix M, which has seven rows and $N_{images}$ columns, can be precomputed after the phase shifts are chosen, and the solution of the linear system can be computed by matrix multiplication as $U=M^t I$, where the same matrix $M^t$ is used for all the pixels.

In act 520, the camera offset $o_c$ and the camera amplitude $a_c$ corresponding to the pixel (u, v) are estimated as:

$$o_c = U_1$$

$$a_c = \sqrt{(U_2^2 + U_3^2 + U_4^2 + U_5^2 + U_6^2 + U_7^2)/3}$$

In act 525 it is determined whether or not the pixel is illuminated by the patterns or not as a function of the magnitude of the camera amplitude $|a_c|$. If the estimated value for the camera amplitude $a_c$ is very doze to or equal to zero, it is most likely because the pixel (u, v) is occluded, and it is not illuminated by the projected patterns. In that case it is best to label the pixel as invalid, and continue decoding other pixels. If it is determined that the pixel is not illuminated, the process jumps to act 560.

If it is determined that the pixel is illuminated, in act 527 the sines and cosines $s_0$, $s_1$, $s_2$, $c_0$, $c_1$, $c_2$, corresponding to the pixel (u, v) are estimated as follows:

$$s_0 = U_3/a_c = \sin(f_n x), c_0 = U_2/a_c = \cos(f_n x) \quad \text{(Eqn. 9)}$$

$$s_1 = U_5/a_c = \sin(f_{n-1}x), c_1 = U_4/a_c = \cos(f_{n-1}x) \quad \text{(Eqn. 10)}$$

$$s_2 = U_7/a_c = \sin(f_{n-2}x), c_2 = U_6/a_c = \cos(f_{n-2}x) \quad \text{(Eqn. 11)}$$

Equations 9, 10 and 11 can be rewritten as follows:

$$\cos(f_1 x) = \frac{\cos(f_n x) + \cos(f_{n-2}x)}{2 \cos(f_{n-1} x)} = \frac{c_0 + c_2}{2 c_1} \quad \text{(Eqn. 12)}$$

$$\cos(f_1 x) = \frac{\sin(f_n x) + \sin(f_{n-2}x)}{2 \sin(f_{n-1} x)} = \frac{s_0 + s_2}{2 s_1} \quad \text{(Eqn. 13)}$$

Equations 12 and 13 may be exploited to estimate the absolute phase corresponding to $f_{base}$ as follows, $$\hat{x} = \frac{1}{f_1} \cos^{-1}\left(\frac{c_0 + c_2}{2c_1}\right) \quad \text{(Eqn. 14)}$$

$$\hat{x} = \frac{1}{f_1} \cos^{-1}\left(\frac{s_0 + s_2}{2s_1}\right) \quad \text{(Eqn. 15)}$$

Since $c_1$ and $s_1$ are never simultaneously equal to zero, because $c_1^2 + s_1^2 = 1$, to obtain higher numerical accuracy in the example of FIG. 5, equation 14 may be used to estimate $\hat{x}$ when $|c_1|$ is greater than $|s_1|$, and Equation 15 is used otherwise.

As such, in method 500, in act 530 it is determined whether or not the magnitude $|c_1|$ is larger than the magnitude $|s_1|$, and based on the determination in act 530, if $|c_1|$ is larger than $|s_1|$, then the relative base phase 2 is estimated using Equation 14 in act 535, and otherwise the relative based phase is estimated using Equation 15 in act 540.

Since the function $\cos^{-1}(c)$ returns values in the range $[0, \pi]$, this ensures that $\hat{x}$ belongs to $[0, x_{max}]$ as desired. Therefore, the value $\hat{x}$ computed in act 535 or 540 is the phase value corresponding to $f_{base} = 2f_1$.

In act 545, the relative phases for the selected pixel in each of the patterns with the different frequencies are determined as follows:

$$\widehat{x_0} = \frac{1}{f_n}\tan^{-1}(s_0, c_0), \widehat{x_1} = \frac{1}{f_{n-1}}\tan^{-1}(s_1, c_1), \quad \text{(Eqn. 16)}$$

$$\widehat{x_2} = \frac{1}{f_{n-2}}\tan^{-1}(s_2, c_2)$$

In act 550, the three absolute phases $x_0$, $x_1$, and $x_2$ at each image pixel are determined based on the above relative phases. An example of a suitable process of phase unwrapping is described below. The absolute phases $x_0$, $x_1$, and $x_2$ provide three separate but similar estimates of the projector column corresponding to the camera pixel, which can be combined as a single average estimate in act 555 to produce an absolute phase measurement with less measurement noise than each individual value. The average estimate may be used together with the system geometric calibration to create a 3D model of the scene.

In act 560, if additional pixels of the image remain to be analyzed, another pixel is selected in act 570 and the method returns to act 515.

In some embodiments, method 500 may be executed by a computer system with parallel architecture, such as but not limited to a Graphics Processing Unit (GPU). In such cases, acts 515 to 555 may be executed in parallel so that the acts are performed for multiple pixels at the same time, rather than sequentially, resulting in an increase in processing speed.

Figure 6:
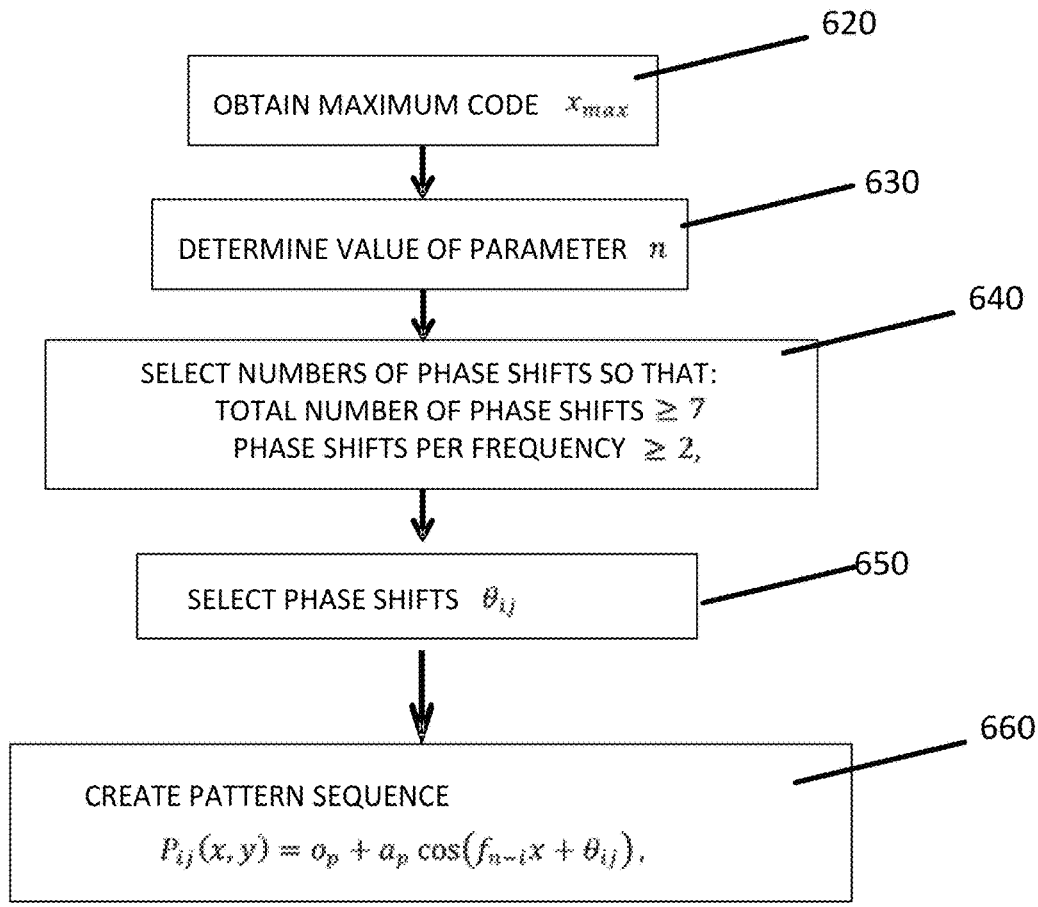
FIG. 6 is a flow chart of a method of selecting parameters and generating images to be projected, according to some embodiments.

FIG. 6 is a flow chart of a method of selecting parameters and generating images to be projected, according to some embodiments. Method 600 begins in act 620, in which a maximum code $x_{max}>0$ is obtained. This value may, for instance, be obtained based on specifications of the projector to be used to project the images. Alternatively, the value can simply be set based on a desired image size.

In act 630, a value of n is selected (e.g., by a user). The value of n uniquely defines three frequencies $f_n$, $f_{n-1}$, and $f_{n-2}$, which are used to create the phase shifting patterns as described above. Different applications may choose to create sequences with different number of patterns. For instance, if three or more phase shifts are available for each frequency a separate vector u could be solved for each one. Alternatively, the camera offset $o_c$ may be considered constant across all images for a single pixel and to solve a single linear system of equations.

In act 640 the numbers of phase shifts for each of the images to be generated are selected so that the total number of phase shifts is at least seven and so that each frequency has at least two associated phase shifts. The example set of images in FIG. 4, for instance, meets these requirements.

In act 650, values of phase shifts are selected $\theta_{ij}$, where the index i corresponds to the set of images with the same frequency and the index j corresponds to the different phase shifts applied to each of these images.

In act 660 images may be generated based on the selected frequencies and phase shifts, as defined by the following equation:

$$P_{ij}(x,y)=o_p+a_p\cos(f_{n-i}x+\theta_{ij})$$

which dictates the intensity of each pixel having a (row, column) coordinate of (x, y) within an image in terms of the selected values. Values of $o_p$ and $a_p$ may be selected to fit the dynamic range of the projector. It will be appreciated that in other schemes in which the pixels are non-square, the coordinate of a pixel may be represented by other coordinates, such as (left_diag, right_diag).

Figure 7:
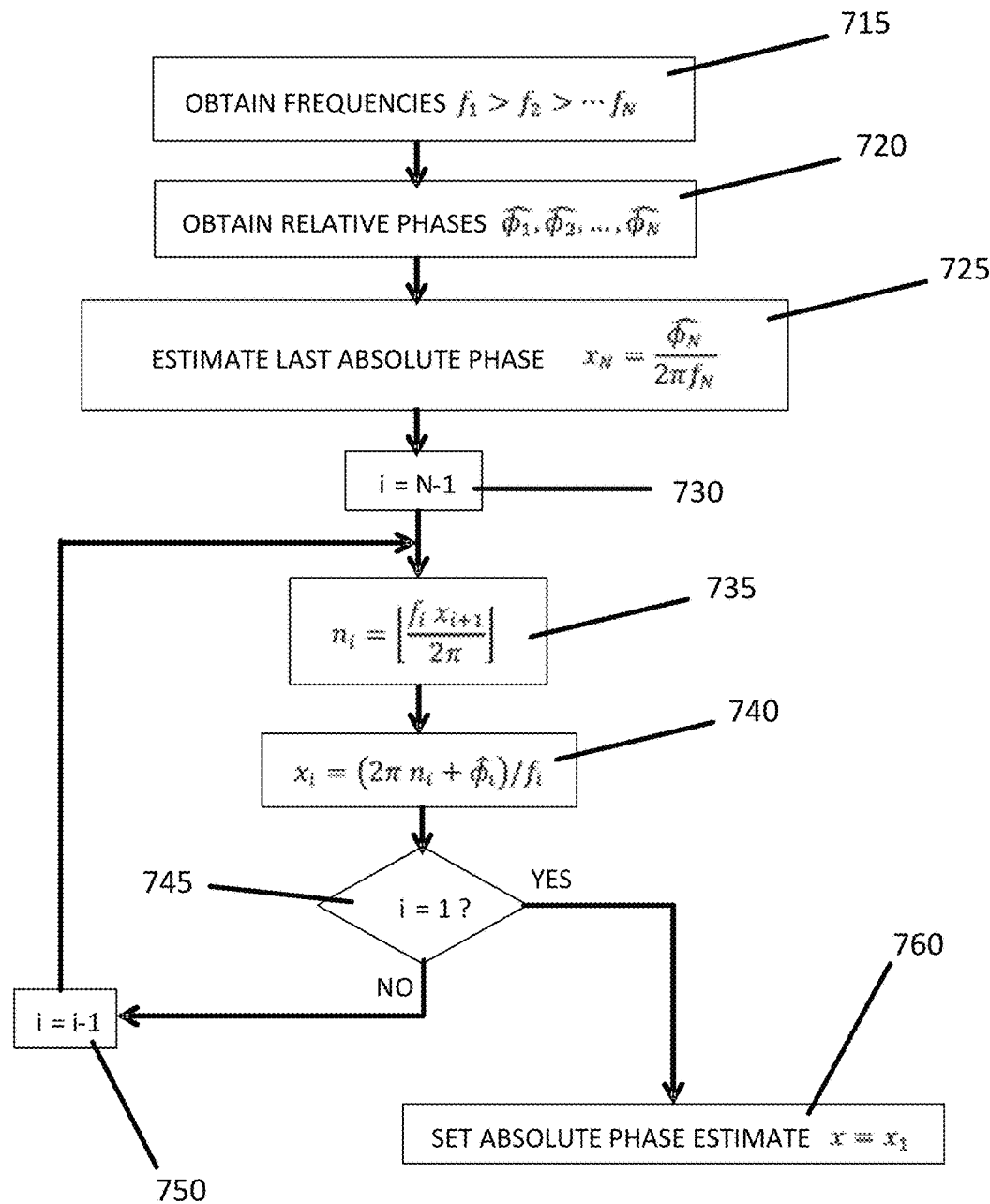
FIG. 7 is a flowchart of a method of phase unwrapping, according to some embodiments.

FIG. 7 is a flowchart of a method of phase unwrapping, according to some embodiments. As discussed above, phase unwrapping is a process of determining the correct value of N in Equation 8:

$$x=N\,T+\hat{x} \quad (\text{Eqn. 8})$$

which relates an absolute phase x to a relative phase $\hat{x}$. Method 700 may be performed, for instance, as part of act 550 shown in FIG. 5 or as part of act 341 shown in FIG. 3.

In general, phase unwrapping may be performed where the pattern sequence comprises a single frequency with the help of external information such as the measurement of a reference plane, or continuity assumptions of the scene. In the example of FIG. 7, phase unwrapping is performed based on a decreasing sequence of N frequencies $f_1 > f_2 > \ldots f_N$, where the last frequency is less than or equal to a base frequency $f_N \leq f_{base}=2\pi/x_{max}$.

In act 715 of method 700, the decreasing sequence of N frequencies is obtained. In act 720, a sequence of relative phases $\hat{\phi}_1, \hat{\phi}_2, \ldots, \hat{\phi}_N$ is obtained, the relative phases satisfying the following constraints for each value of i=1, 2, ..., N: $0 \leq \hat{\phi}_i < 2\pi$, and $\hat{\phi}_i$ is congruent to ($f_i$ x) modulo $2\pi$. The last property means that for each value of i=1, 2, ..., N there exist a non-negative integer $n_i$ so that $f_i$ x=$2\pi n_i+\hat{\phi}_i$, and where x is the absolute phase being estimated.

In act 725, a last absolute phase value $x_N$ is estimate. Then, in the loop defined by acts 730, 735, 740, 745, and 750, the method 700 iteratively produces a sequence of absolute phase estimates in decreasing order $x_{N-1}, \ldots, x_2, x_1$. Finally, in act 760 the absolute phase estimate is set as the last value $x=x_1$.

Figure 8:
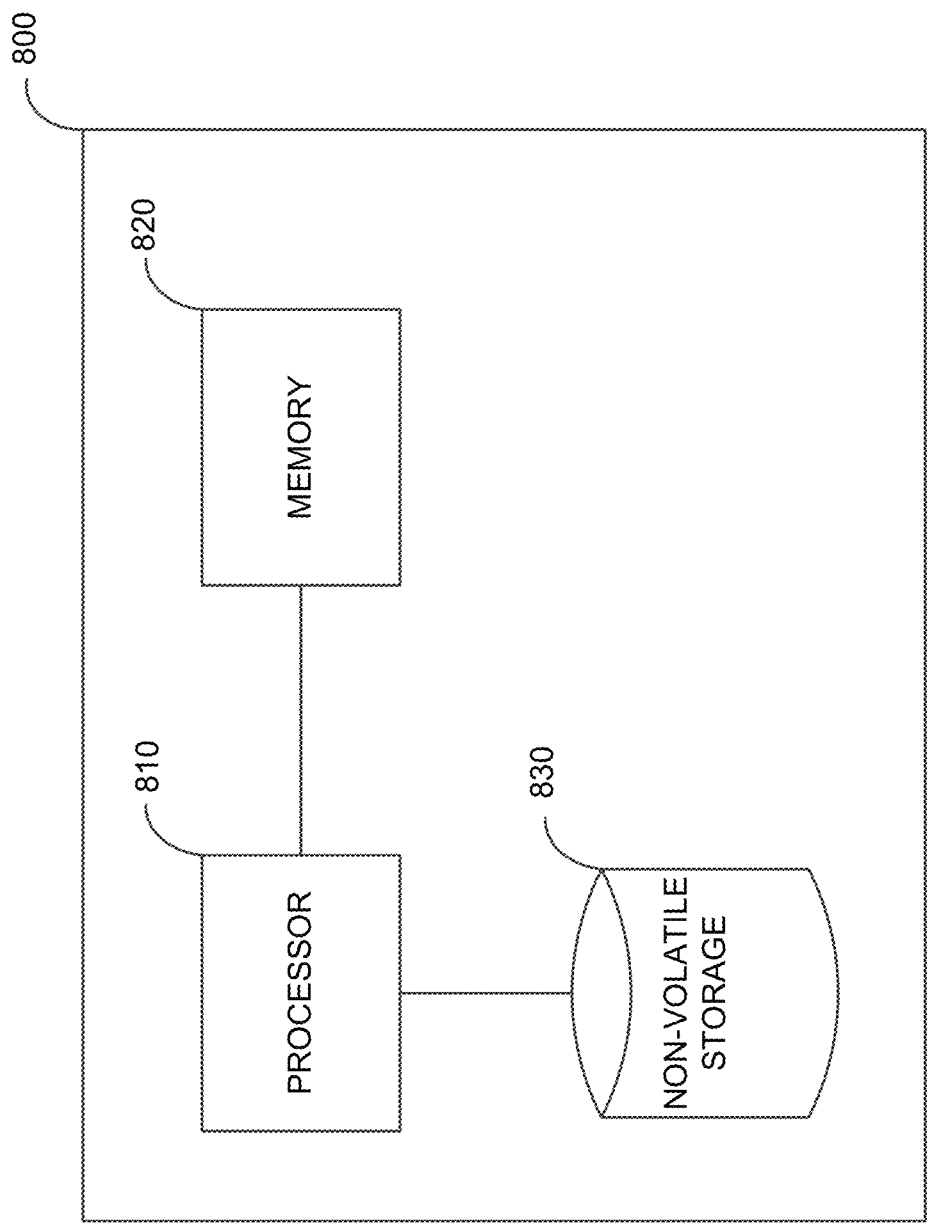
FIG. 8 illustrates an example of a computing system environment on which aspects of the invention may be implemented.

An illustrative implementation of a computer system 800 that may be used to perform any of the aspects of structured light scanning is shown in FIG. 8. The computer system 800 may include one or more processors 810 and one or more non-transitory computer-readable storage media (e.g., memory 820 and one or more non-volatile storage media 830). The processor 810 may control writing data to and reading data from the memory 820 and the non-volatile storage device 830 in any suitable manner, as the aspects of the invention described herein are not limited in this respect. To perform functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810.

In connection with techniques described herein, code used to, for example, generate images of spatially repeating patterns of a selected frequency and phase shift, cause projection of such an image via a projector, capture an image of a target using a camera, determine a relative phase for a pixel of an image captured by a camera, determine an absolute phase for a pattern of a base frequency, determine a three-dimensional position of an imaged point, etc. may be stored on one or more computer-readable storage media of computer system 800. Processor 810 may execute any such code to provide any techniques for structured light scanning as described herein. Any other software, programs or instructions described herein may also be stored and executed by computer system 800. It will be appreciated that computer code may be applied to any aspects of methods and techniques described herein. For example, computer code may be applied to interact with an operating system to capture images or project images through conventional operating system display processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer-implemented method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein the first, second and third relative phases are calculated for pixels with the first, second and third images, respectively, and wherein said pixels have a common pixel coordinate in the first, second and third images.

2. A computer-implemented method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and obtaining a fourth image of the object, the fourth image being captured whilst the object is illuminated with light having the spatially repeating pattern of the first frequency phase-shifted with respect to the light illuminating the object during capture of the first image, and wherein calculating the first relative phase is further based on the fourth image.

3. The method of claim 2, wherein calculating the first relative phase is based on intensities of at least two pixels including a pixel of the first image and a pixel of the fourth image, wherein the at least two pixels have identical pixel coordinates within respective images.

4. A computer-implemented method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein the difference between the first and second frequencies and the difference between the second and third frequencies is equal to half the base frequency.

5. A computer-implemented method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein calculating the at least one absolute phase is not based on an image of the object illuminated with light having a spatially repeating pattern of the base frequency.

6. A non-transitory computer-readable medium comprising instructions that, when executed by at least one processor, perform a method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein the first, second and third relative phases are calculated for pixels with the first, second and third images, respectively, and wherein said pixels have a common pixel coordinate in the first, second and third images.

7. A non-transitory computer-readable medium comprising instructions that, when executed by at least one processor, perform a method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and obtaining a fourth image of the object, the fourth image being captured whilst the object is illuminated with light having the spatially repeating pattern of the first frequency phase-shifted with respect to the light illuminating the object during capture of the first image, and wherein calculating the first relative phase is further based on the fourth image.

8. The non-transitory computer-readable medium of claim 7, wherein calculating the first relative phase is based on intensities of at least two pixels including a pixel of the first image and a pixel of the fourth image, wherein the at least two pixels have identical pixel coordinates within respective images.

9. A non-transitory computer-readable medium comprising instructions that, when executed by at least one processor, perform a method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein the difference between the first and second frequencies and the difference between the second and third frequencies is equal to half the base frequency.

10. A non-transitory computer-readable medium comprising instructions that, when executed by at least one processor, perform a method of determining the shape of an object, the method comprising:

obtaining a first image of an object, the first image being captured whilst the object is illuminated with light having a spatially repeating pattern of a first frequency;

obtaining a second image of the object, the second image being captured whilst the object is illuminated with light having a spatially repeating pattern of a second frequency;

obtaining a third image of the object, the third image being captured whilst the object is illuminated with light having a spatially repeating pattern of a third frequency, wherein the first, second and third frequencies are different and wherein a difference between the first and second frequencies is equal to a difference between the second and third frequencies;

calculating, based at least in part on the first image, at least a first relative phase representing a relative position within the spatially repeating pattern having the first frequency;

calculating, based at least in part on the second image, at least one a second relative phase representing a relative position within the spatially repeating pattern having the second frequency;

calculating, based at least in part on the third image, at least a third relative phase representing a relative position within the spatially repeating pattern having the third frequency;

calculating, for a pattern of a base frequency, and based at least in part on the first, second and third frequencies, at least one absolute phase representing an absolute position within the pattern of the base frequency;

calculating spatial coordinates for at least one three-dimensional point on the object based at least in part on the calculated absolute phase; and wherein calculating the at least one absolute phase is not based on an image of the object illuminated with light having a spatially repeating pattern of the base frequency.

* * * * *